Sept. 9, 1958 J. C. TANNOCK 2,851,243
JUMPERS FOR DOMESTIC AND INDUSTRIAL
WATER TAPS, VALVES AND THE LIKE
Filed May 18, 1953
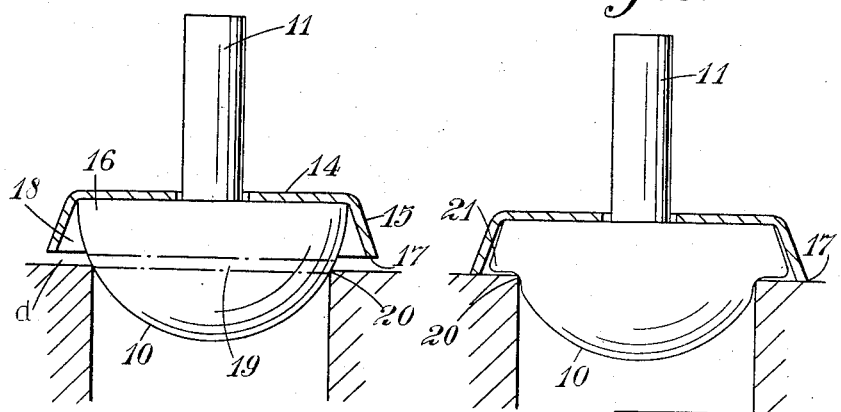
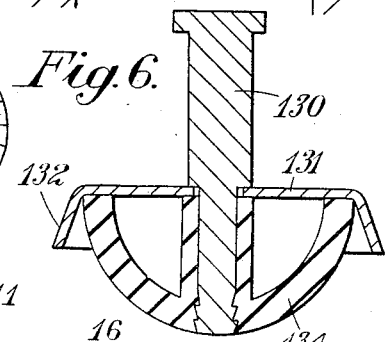
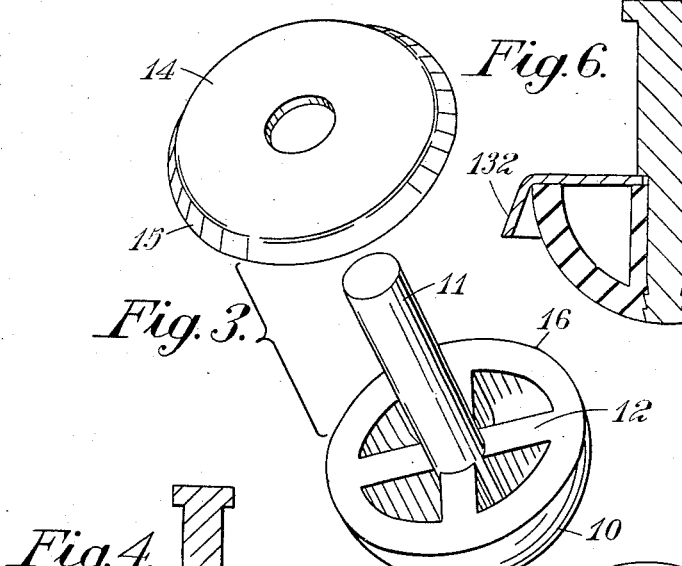
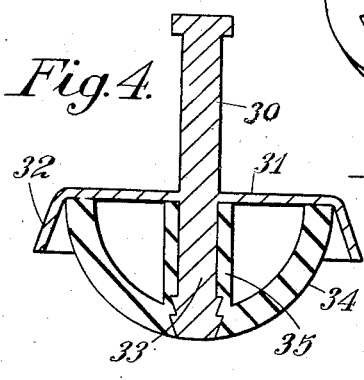
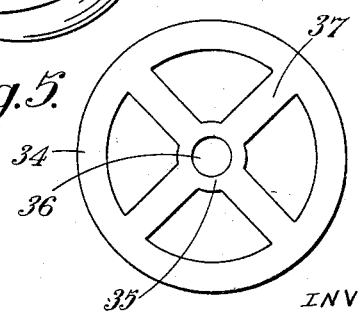
INVENTOR
John C. Tannock
By Watson, Cole, Grindle
& Watson
ATTORNEYS ced Sept. 9, 1958

United States Patent Office
2,851,243
JUMPERS FOR DOMESTIC AND INDUSTRIAL WATER TAPS, VALVES AND THE LIKE John Caldwell Tannock, London, England, assignor of one-half to Plastomatic Limited, London, England, a British company Application May 18, 1953, Serial No. 355,456

Claims priority, application Great Britain May 27, 1952

4 Claims. (Cl. 251—332)

The invention relates to jumpers for domestic and industrial water taps, or faucets, valves and the like and is concerned with jumpers having a head, which provides the valve face, moulded of rubber or a resiliently deformable plastic.

It is an object of the invention to provide such a jumper with means which limit the deformation of the head when in use. A further object is the provision of a jumper which is long-lasting and simple and cheap to manufacture.

The invention provides a jumper for a tap or valve comprising a head of a resiliently deformable material and having a convex front surface providing an annular valve face, a stem extending from a rear surface of the head and a constraining member comprising an annulus of a comparatively rigid material seating on the rear surface of the head around the stem and a circumferential flange extending from the annulus around the head, the free edge of the flange being spaced away from the head behind the valve face to an extent such that the flange permits only limited expansion of the head above the valve face.

Preferably the free edge of the flange stops short of the valve face by an amount such that when the head is deformed against a valve seat, in use, the edge of the flange will contact the seat and the deformed material will substantially fill the space aforesaid between the flange and the head.

The stem may be integral with the head or with the constraining members.

The head may be hollow and the convex front surface may be of part spherical form.

Two practical constructions of jumpers according to the invention and a variation are shown in the drawings and will now be described. In the drawings:

Figure 1 is a section showing one construction of jumper about to be compresed against a tap seat, Figure 2 shows the jumper after compression against the seat, Figure 3 is an exploded perspective view of the jumper shown in Figures 1 and 2, Figure 4 is a section through the second construction, Figure 5 is a view showing the back of the head embodied in the jumper shown in Figure 4, and Figure 6 is a view similar to Figure 4 showing a variation of the second construction.

The jumper shown in Figures 1–3 is intended for use in a domestic water tap and comprises a head 10 and a stem 11 moulded as an integral unit in a non-hygroscopic plastic material such as polyvinylchloride or polythene (e. g. the material known as Alkathene). The head 10 has its front surface of part-spherical form and is hollow. The stem 11 is attached at its end to the inner face of the head and is also attached to the head by four moulded radial ribs 12.

Seating on the rear face of the head there is a metal constraining member composed of an annulus 14 and a flared flange 15. The annulus 14 fits around the stem 11 and serves as a bearing for the tap spindle. The flange fits closely around the edge 16 of the head and is spaced away from the head at its free edge 17, as shown at 18, due to the flare of the flange and the curvature of the head.

In use the valve face is provided by an annular zone, indicated at 19, of the head, which seats on the edge portion of the tap seating 20. When pressure is applied to the jumper by the tap spindle acting against the annulus 14, the head is deformed in the manner indicated in Figure 2, the material of the head being displaced into the space 18 as shown at 21. The extent of the deformation is limited by engagement of the edge 17 with the tap seating and/or by the space 18 becoming filled with displaced material.

The distance $d$ between the edge 17 and the seating shown in Figure 1 may be about $\frac{1}{16}$ inch for a tap having a $\frac{1}{2}$ inch bore.

Figures 4 and 5 show a modified form of the above construction in which the stem 30 is integral with the metal annulus 31 and flange 32, and there is a holding shank 33 extending from the underface of the annulus. The head 34 is as before, moulded of a suitable plastic and is of hollow form. In place of the integral moulded stem above described there is a central hub 35 having a hole 36 which is a tight fit on the shank 33 to hold the two parts together. The hub is attached to the wall of the head by ribs 37.

Figure 6 shows a variation of the construction just described in which the stem 130, the constraining member 131, 132 and the head 134 are separately constructed, the stem and constraining member being of metal.

If desired the flange in either of the above examples may be of cylindrical form, i. e. without flare. Furthermore there may be three, or more than four, radial ribs connecting the stem or hub to the wall of the head.

I claim:

1. A valve jumper comprising as a unit a head portion moulded of soft elastic material, which head portion is hollow and is composed of a hemi-spherical cup portion, a plurality of radial reinforcement partition portions integral with said cup portion and an axial hub portion to which the radial partition portions are all connected, said head portion having a lower convex face and an upper diametral face, a rigid stem portion extending upwards axially from the centre of the said diametral face and having a downward shank extending into said axial hub portion, a rigid plate which lies flat against the diametral face of the head, said plate extending beyond the diametral face of the head and including a circumferential compression-limiting flange which is directed downwards and is spaced outwards from the head portion leaving a circumferential space which is normally empty but is arranged to be occupied and filled by the soft elastic material of the head when said head is distorted by axial compression in the valve-closed state of the jumper.

2. A valve jumper according to claim 1 in which the rigid plate is integral with the stem portion.

3. A jumper for a valve or the like comprising a soft elastic head portion formed in the shape of a hemispherical shell having a substantially smooth exterior surface and a plurality of integral reinforcement partitions projecting inwardly from the interior surface of said shell, a rigid stem united at one end to said head portion and extending axially thereof in supporting relationship with the inward ends of said partitions, a rigid plate supported by said stem substantially at right angles to the stem axis in contact with the annular edge of said shell and constrained by the stem against movement away from said shell, said plate projecting beyond the lateral limits of said shell and having a terminal circumferential flange directed downwardly and away from the adjacent exterior surface of said shell, the interior face of said flange defining with said adjacent exterior surface of said shell a generaly inverted V-shaped groove to receive the shell material upon distortion of the same, said flange constituting a fixed stop limiting movement of the jumper in one direction.

4. The combination with a valve seat formed by the terminal portion of the cylindrical wall of a generally circular valve port and the surface surrounding said port, which surface extends substantially at right angles to said wall and meets the terminal edge of said wall along a generally circular line, of a jumper for closing the port comprising a soft elastic head portion formed as a hemispherical shell having a substantially smooth exterior surface and a diameter greater than the diameter of said cylindrical wall, a rigid stem united to said head portion and extending axially thereof, a rigid plate supported by said stem substantially at right angles to the stem axis, in contact with the annular edge of said shell and constrained by the stem against movement away from said shell, said plate having at the lateral limits of said shell a terminal circumferential flange directed downwardly and away from the adjacent exterior surface of the shell, the interior face of said flange defining with said adjacent exterior surface of said shell a generally inverted V-shaped groove, said flange contacting the surrounding surface to limit the maximum ingress of said head portion into the port, the surface of said shell contacting the line of convergence of the cylindrical wall and surrounding surface in advance of the flange contacting the surrounding surface, and upon maximum ingress said shell being compressed and distorted by virtue of the smaller diameter of the cylindrical wall, substantially filling the inverted V-shaped groove, and being constrained by the flanged plate against axial movement away from the port, so that the shell has adjacent annular portions of its surface making sealing contact with both the cylindrical wall and surrounding surface to provide a double sealing effect for the port.

References Cited in the file of this patent

UNITED STATES PATENTS

| | | |
|---|---|---|
| 874,652 | Bailey | Dec. 24, 1907 |
| 1,939,024 | Ryan | Dec. 12, 1933 |
| 2,272,351 | Polcari | Feb. 10, 1942 |
| 2,300,111 | Edlund | Oct. 27, 1942 |
| 2,452,354 | Bucknell | Oct. 26, 1948 |
| 2,482,198 | Melichar | Sept. 20, 1949 |
| 2,638,307 | Fortune | May 12, 1953 |
| 2,646,246 | Tucci | July 21, 1953 |
| 2,654,560 | Smith | Oct. 6, 1953 |

OTHER REFERENCES

"1948 Modern Plastics Encyclopedia," (TP–986. A2–M–5–1948), pp. 152–154, published by Plastic Catalogue Corp., 122 East 42nd St., New York 17, N. Y. (Copy in Scientific Library.)